United States Patent
Gallorini et al.

(10) Patent No.: US 12,010,781 B2
(45) Date of Patent: Jun. 11, 2024

(54) INDUCTION COOKER

(71) Applicants: Tyco Electronics (Shanghai) Co. Ltd., Shanghai (CN); MEAS France, Toulouse (FR)

(72) Inventors: Romuald Gallorini, Toulouse (FR); Mingjie Fan, Shanghai (CN); Shaoyong Wang, Shanghai (CN)

(73) Assignees: Tyco Electronics (Shanghai) Co., Ltd., Shanghai (CN); MEAS France, Toulouse (FR)

( * ) Notice: Subject to any disclaimer, the term of this patent is extended or adjusted under 35 U.S.C. 154(b) by 409 days.

(21) Appl. No.: 16/816,999

(22) Filed: Mar. 12, 2020

(65) Prior Publication Data
US 2020/0296806 A1 Sep. 17, 2020

(30) Foreign Application Priority Data
Mar. 12, 2019 (CN) .......................... 201910184253.1

(51) Int. Cl.
*H05B 6/06* (2006.01)
*H05B 1/02* (2006.01)
*H05B 6/12* (2006.01)

(52) U.S. Cl.
CPC ........... *H05B 6/062* (2013.01); *H05B 1/0266* (2013.01); *H05B 6/1272* (2013.01)

(58) Field of Classification Search
CPC .. H05B 1/0266; H05B 2213/06; H05B 6/062; H05B 6/065; H05B 6/1272
See application file for complete search history.

(56) References Cited

U.S. PATENT DOCUMENTS

| | | | |
|---|---|---|---|
| 9,433,037 B2* | 8/2016 | Isoda | H05B 6/08 |
| 2008/0087661 A1* | 4/2008 | Haag | H05B 6/065 |
| | | | 219/620 |

FOREIGN PATENT DOCUMENTS

| | | | | |
|---|---|---|---|---|
| JP | 2006114320 A | * | 4/2006 | ............. H05B 6/062 |
| JP | 6659561 B2 | * | 3/2020 | ............ A47J 36/321 |

OTHER PUBLICATIONS

"Cubizolles, How to find and track communicative guided cooking tables and communicative cookware on the table, 2015" (Year: 2015).*
Machine translation of JP-2006114320: Bunya, Induction Heating Device and Induction Heating Cooker, 2006 (Year: 2006).*

* cited by examiner

*Primary Examiner* — Janie M Loeppke
*Assistant Examiner* — Abigail H Rhue
(74) *Attorney, Agent, or Firm* — Barley Snyder

(57) ABSTRACT

An induction cooker including a plurality of stoves each having a transmitting coil and a driver driving the transmitting coil, and a controller controlling the driver of each of the stoves to generate a drive signal. The drive signal of each of the stoves is a periodically cyclic modulation signal sequence. The stoves are identifiable and distinguishable from each other by the periodically cyclic modulation signal sequences that are different for each of the stoves.

12 Claims, 2 Drawing Sheets

INDUCTION COOKER

CROSS-REFERENCE TO RELATED APPLICATION

This application claims the benefit of the filing date under 35 U.S.C. § 119(a)-(d) of Chinese Patent Application No. 201910184253.1, filed on Mar. 12, 2019.

FIELD OF THE INVENTION

The present invention relates to an induction cooker and, more particularly, to an induction cooker with a plurality of stoves.

BACKGROUND

With the development of smart home appliances, some high-end induction cookers with multiple stoves may simultaneously heat a plurality of pots. For this type of induction cooker, temperatures of the pots placed on the plurality of stoves must be detected and controlled, respectively.

A temperature sensor is generally provided on each pot to detect the temperature of the pot. The detected temperature signal of each pot is transmitted to a controller. However, the controller cannot determine which stove the received temperature signal corresponds to. Consequently, it is impossible to adjust the temperatures of the pots, respectively, by controlling the respective stoves, impairing effective use of the induction cooker.

SUMMARY

An induction cooker including a plurality of stoves each having a transmitting coil and a driver driving the transmitting coil, and a controller controlling the driver of each of the stoves to generate a drive signal. The drive signal of each of the stoves is a periodically cyclic modulation signal sequence. The stoves are identifiable and distinguishable from each other by the periodically cyclic modulation signal sequences that are different for each of the stoves.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
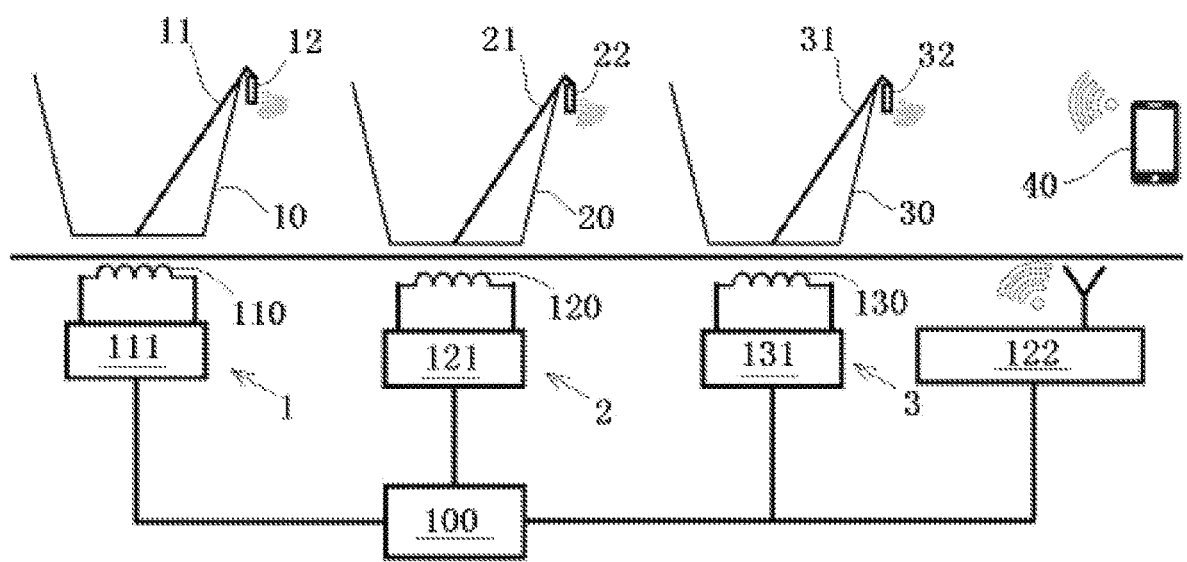
FIG. 1 is a schematic block diagram of an induction cooker according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An induction cooker according to an embodiment, as shown in FIG. 1, comprises a plurality of stoves 1, 2, 3 and a controller 100. In the shown embodiment, the induction cooker has three stoves 1, 2, 3. In other embodiments, the induction cooker may have two, four, or more stoves.

Each stove 1, 2, 3, as shown in FIG. 1, includes a transmitting coil 110, 120, 130 and a driver 111, 121, 131. The driver 111, 121, 131 is configured to drive the respective transmitting coil 110, 120, 130 to work.

As shown in FIG. 1, in an embodiment, for convenience of explanation, the three stoves 1, 2, 3 are referred as a first stove 1, a second stove 2, and a third stove 3, respectively. The first stove 1 has a first transmitting coil 110 and a first driver 111. The second stove 2 has a second transmitting coil 120 and a second driver 121. The third stove 3 has a third transmitting coil 130 and a third driver 131. The controller 100 is adapted to control the driver 111, 121, 131 of each stove 1, 2, 3 to generate a drive signal. The drive signal, in an embodiment, is a high frequency AC signal.

Figure 2:
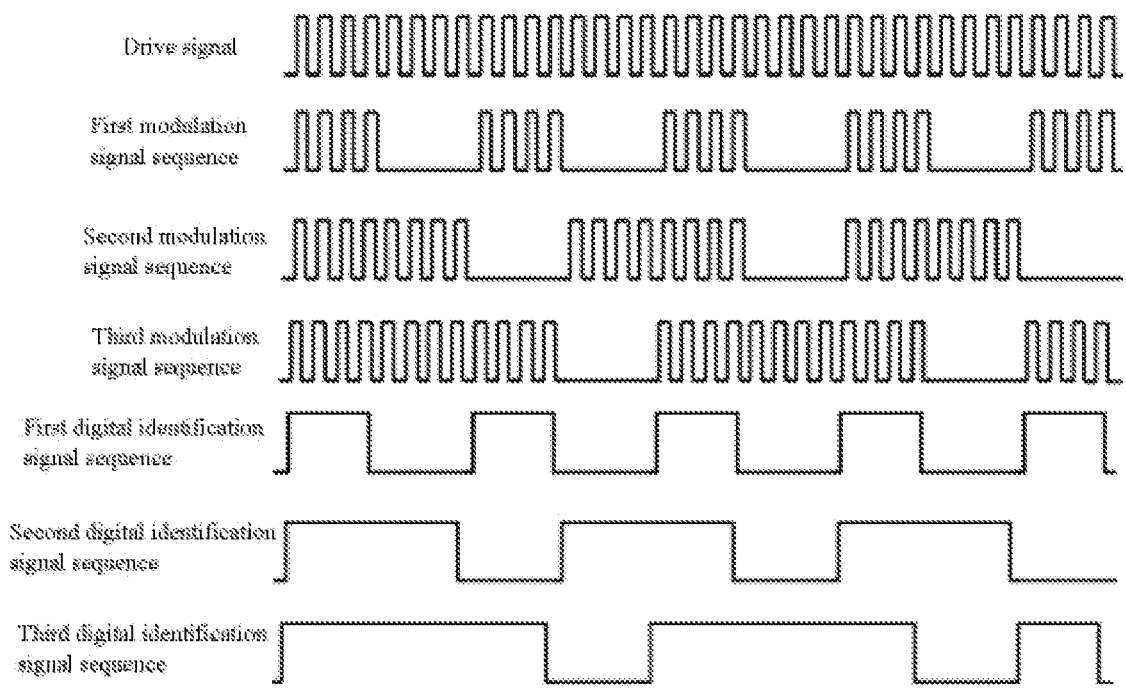
FIG. 2 is a schematic chart of a drive signal, a plurality of modulation signal sequences, and a plurality of digital identification signal sequences according to an embodiment.

FIG. 2 shows a schematic diagram of a drive signal, a modulation signal sequence, and a digital identification signal sequence according to an exemplary embodiment of the present invention.

As shown in FIGS. 1-2, in an embodiment, the drive signal generated by the driver 111, 121, 131 of each stove 1, 2, 3 is a periodically cyclic modulation signal sequence. The modulation signal sequences in the drive signals generated by the drivers 111, 121, 131 of different stoves 1, 2, 3 are different from each other, so that the stoves 1, 2, 3 are identified and distinguished from each other according to the modulation signal sequences. In an embodiment, the modulation signal sequence in the drive signal generated by the first driver 111 of the first stove 1 is referred as a first modulation signal sequence, the modulation signal sequence in the drive signal generated by the second driver 121 of the second stove 2 is referred as a second modulation signal sequence, and the modulation signal sequence in the drive signal generated by the third driver 131 of the third stove 3 is referred as a third modulation signal sequence. In various embodiments, at least one of amplitudes, phases, and frequencies of the modulation signal sequences in the drive signals generated by the drivers 111, 121, 131 of different stoves 1, 2, 3 are different.

As shown in FIG. 2, in an embodiment, the amplitudes of the first modulation signal sequence, the second modulation signal sequence and the third modulation signal sequence are different from each other. Thereby, in this case, it is possible to identify and distinguish the first stove 1, the second stove 2 and the third stove 3 according to the amplitudes of the first, second and third modulation signal sequences.

In another exemplary embodiment, the phases of the modulation signal sequences in the drive signals generated by the drivers 111, 121, 131 of different stoves 1, 2, 3 may be different. Thereby, in this case, it is possible to identify and distinguish the first stove 1, the second stove 2 and the third stove 3 according to the phases of the first, second and third modulation signal sequences.

In another exemplary embodiment, the frequencies of the modulation signal sequences in the drive signals generated by the drivers 111, 121, 131 of different stoves 1, 2, 3 may be different. Thereby, in this case, it is possible to identify and distinguish the first stove 1, the second stove 2 and the third stove 3 according to the frequencies of the first, second and third modulation signal sequences.

As shown in FIG. 1, the induction cooker comprises a plurality of pots 10, 20, 30. In the shown embodiment, the induction cooker comprises three pots 10, 20, 30. In other embodiments, the induction cooker may comprise two, four, or more pots.

As shown in FIG. 1, the plurality of pots 10, 20, 30 are adapted to be placed on the plurality of stoves 1, 2, 3, respectively, with each of the pots 10, 20, 30 placed on one of the stoves 1, 2, 3. The transmitting coils 110, 120, 130 of the plurality of stoves 1, 2, 3 are adapted to heat the plurality of pots 10, 20, 30 placed on the plurality of stoves 1, 2, 3, respectively, with each of the coils 110, 120, 130 heating one of the pots 10, 20, 30.

Each pot 10, 20, 30, shown in FIG. 1, has a receiving coil electromagnetically coupled with the transmitting coil 110, 120, 130 of the stove 1, 2, 3. The receiving coil receives the drive signal transmitted from the transmitting coil 110, 120, 130. Thereby, it is possible to identify the stove 1, 2, 3 corresponding to the respective pot 10, 20, 30 according to the modulation signal sequence in the received drive signal.

Each pot 10, 20, 30 includes a signal process circuit. The signal process circuit is adapted to process the drive signal received by the receiving coil and convert the modulation signal sequence in the drive signal into a digital identification signal sequence. In this way, it is possible to identify the stove 1, 2, 3 corresponding to the respective pot 10, 20, 30 according to the digital identification signal sequence. As shown in FIG. 2, the first stove 1 corresponds to the first digital identification signal sequence, the second stove 2 corresponds to the second digital identification signal sequence, and the third stove 3 corresponds to the third digital identification signal sequence. Because the amplitudes of the first, second and third digital identification signal sequences are different from each other, the first, second and third stoves 1, 2, 3 corresponding to the first, second and third pots 10, 20, 30, respectively, may be accurately identified according to the first, second and third digital identification signal sequences.

Each pot 10, 20, 30, as shown in FIG. 1, includes a temperature sensor 11, 21, 31 and a wireless transmitting module 12, 22, 32. The temperature sensor 11, 21, 31 is configured to detect a temperature of the pot 10, 20, 30. The wireless transmitting module 12, 22, 32 is adapted to transmit the digital identification signal sequence and the detected temperature signal to a wireless mobile communication device 40 and/or a wireless communication module 122 provided on the induction cooker.

The controller 100, shown in FIG. 1, identifies the stove 1, 2, 3 corresponding to the respective temperature signal based on the digital identification signal sequence received by the wireless mobile communication device 40 and/or the wireless communication module 122. The controller 100 controls the driver 111, 121, 131 of the respective stove 1, 2, 3 based on the temperature signal received by the wireless mobile communication device 40 and/or the wireless communication module 122, so that the temperature of the respective stove 1, 2, 3 reaches a predetermined temperature. In this way, it is possible to reasonably adjust the temperatures of the pots 10, 20, 30, respectively, by controlling the respective stoves 1, 2, 3, improving the use of the induction cooker.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle. Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An induction cooker, comprising:
   a plurality of stoves each having a transmitting coil and a driver driving the transmitting coil;
   a controller controlling the driver of each of the stoves to generate a drive signal, the drive signal of each of the stoves is a periodically cyclic modulation signal sequence, the stoves are identifiable and distinguishable from each other by the periodically cyclic modulation signal sequences that are different for each of the stoves; and
   a plurality of pots each placed on one of the stoves, each of the pots has a receiving coil electromagnetically coupled with the transmitting coil of one of the stoves, the receiving coil receives the drive signal from the transmitting coil, one of the stoves corresponding to one of the pots is identified according to the periodically cyclic modulation signal sequence of the drive signal received at the receiving coil of the one of the pots.

2. The induction cooker of claim 1, wherein at least one of an amplitude, a phase, and a frequency of each of the periodically cyclic modulation signal sequences is different for each of the stoves.

3. The induction cooker of claim 2, wherein the amplitude of each of the periodically cyclic modulation signal sequences is different for each of the stoves, and the stoves are identifiable and distinguishable from each other by the amplitude.

4. The induction cooker of claim 2, wherein the phase of each of the periodically cyclic modulation signal sequences is different for each of the stoves, and the stoves are identifiable and distinguishable from each other by the phase.

5. The induction cooker of claim 2, wherein the frequency of each of the periodically cyclic modulation signal sequences is different for each of the stoves, and the stoves are identifiable and distinguishable from each other by the frequency.

6. The induction cooker of claim 1, wherein the transmitting coils of the stoves heat the pots on stoves.

7. The induction cooker of claim 1, wherein each of the pots has a signal process circuit processing the drive signal received by the receiving coil and converting the periodically cyclic modulation signal sequence in the drive signal into a digital identification signal sequence.

8. The induction cooker of claim 7, wherein the one of the stoves corresponding to the one of the pots is identified by the digital identification signal sequence.

9. The induction cooker of claim 8, wherein each of the pots has a temperature sensor detecting a temperature of the pot.

10. The induction cooker of claim 9, wherein each of the pots has a wireless transmitting module transmitting the digital identification signal sequence and a temperature signal from the temperature sensor to a wireless mobile communication device and/or a wireless communication module.

11. The induction cooker of claim 10, wherein the controller identifies one of the stoves corresponding to the temperature signal based on the digital identification signal sequence received by the wireless mobile communication device and/or the wireless communication module.

12. The induction cooker of claim 11, wherein the controller controls the driver of the one of the stoves based on the temperature signal, so that a temperature of the one of the stoves reaches a predetermined temperature.

\* \* \* \* \*